United States Patent
Kamiya et al.

(10) Patent No.: US 11,467,120 B2
(45) Date of Patent: Oct. 11, 2022

(54) GAS SENSOR

(71) Applicant: DENSO CORPORATION, Kariya (JP)

(72) Inventors: Yasutaka Kamiya, Kariya (JP); Tatsuki Ujiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 16/663,516

(22) Filed: Oct. 25, 2019

(65) Prior Publication Data
US 2020/0057018 A1    Feb. 20, 2020

Related U.S. Application Data
(63) Continuation of application No. PCT/JP2018/016635, filed on Apr. 24, 2018.

(30) Foreign Application Priority Data

Apr. 26, 2017   (JP) .............................. JP2017-087445

(51) Int. Cl.
   *G01N 27/407*    (2006.01)
(52) U.S. Cl.
   CPC ..... *G01N 27/4072* (2013.01); *G01N 27/4073* (2013.01); *G01N 27/4076* (2013.01)
(58) Field of Classification Search
   CPC ........... G01N 27/4072; G01N 27/4073; G01N 27/4076
   See application file for complete search history.

(56) References Cited

U.S. PATENT DOCUMENTS

| | | | | |
|---|---|---|---|---|
| 6,210,641 | B1 * | 4/2001 | Yamada | F02D 41/1444 60/276 |
| 6,340,419 | B1 | 1/2002 | Nakae et al. | |
| 8,636,886 | B2 * | 1/2014 | Watanabe | G01N 27/4071 204/429 |
| 2007/0144905 | A1 * | 6/2007 | Tsuji | G01N 27/4075 204/424 |
| 2007/0151851 | A1 * | 7/2007 | Tanaka | G01N 27/4071 204/431 |
| 2017/0261463 | A1 | 9/2017 | Sugiura et al. | |

FOREIGN PATENT DOCUMENTS

JP          2-189454          7/1990

OTHER PUBLICATIONS

Watanabe, JP2017187482A machine translation (Year: 2017).*

* cited by examiner

*Primary Examiner* — Luan V Van
*Assistant Examiner* — Caitlyn Mingyun Sun
(74) *Attorney, Agent, or Firm* — Nixon & Vanderhye P.C.

(57) ABSTRACT

A gas sensor includes a gas sensor element for detecting a specific gas concentration in measured gas. The gas sensor element includes a solid electrolyte, a measured gas side electrode into which measured gas is introduced through a porous diffusion resistance layer, a reference gas side electrode facing a reference gas chamber, and a diffusion space portion between the porous diffusion resistance layer and the measured gas side electrode. The porous diffusion resistance layer has a measured gas inlet opened to an element outer surface and a measured gas outlet opened to the diffusion space portion. A relationship between a distance between the inlet and the outlet and a distance between the outlet and the measured gas side electrode is expressed by $0<L1/(L1+L2)<0.4$.

3 Claims, 6 Drawing Sheets

$$\tau = \frac{L_e}{L} = 1 + \frac{\Delta L}{L}$$
$$\Delta L = L_e - L$$

GAS SENSOR

CROSS-REFERENCE TO RELATED APPLICATION

This application is a U.S. application under 35 U.S.C. 111(a) and 363 that claims the benefit under 35 U.S.C. 120 from International Application No. PCT/JP2018/016635 filed on Apr. 24, 2018, the entire contents of which are incorporated herein by reference. This application is also based on and claims the benefit of priority to Patent Application No. 2017-087445 filed on Apr. 26, 2017, the entire contents of which are incorporated herein by reference.

BACKGROUND

Technical Field

The present disclosure relates to a gas sensor.

Background Art

An exhaust system of an automobile engine is equipped with an exhaust gas purification system including a catalyst for purifying exhaust gas and a gas sensor for detecting oxygen concentration or the like in the exhaust gas.

The gas sensor used for such a purpose typically includes a gas sensor element including a solid electrolyte having oxide ionic conductivity. For example, A known gas sensor element includes a measured gas side electrode that is provided on one surface of the solid electrolyte and is covered by a porous diffusion resistance layer and a reference gas side electrode that is provided on the other surface of the solid electrolyte and faces a reference gas chamber.

SUMMARY

An aspect of the present disclosure is a gas sensor including a gas sensor element for detecting a specific gas concentration in measured gas, wherein: the gas sensor element includes a solid electrolyte, a measured gas side electrode into which measured gas is introduced through a porous diffusion resistance layer, a reference gas side electrode that faces a reference gas chamber, and a diffusion space portion that is provided between the porous diffusion resistance layer and the measured gas side electrode; the porous diffusion resistance layer has a measured gas inlet that is opened to an element outer surface and a measured gas outlet that is opened to the diffusion space portion; and a relationship between a distance L1 between the inlet and the outlet and a distance L2 between the outlet and the measured gas side electrode is expressed by $0 < L1/(L1+L2) < 0.4$.

BRIEF DESCRIPTION OF THE DRAWINGS

The above object and other objects, features, and advantages of the present disclosure will be more clarified by the following detailed description with reference to the accompanying drawings, wherein.

DETAILED DESCRIPTION OF THE PREFERRED EMBODIMENTS

Figure 1:
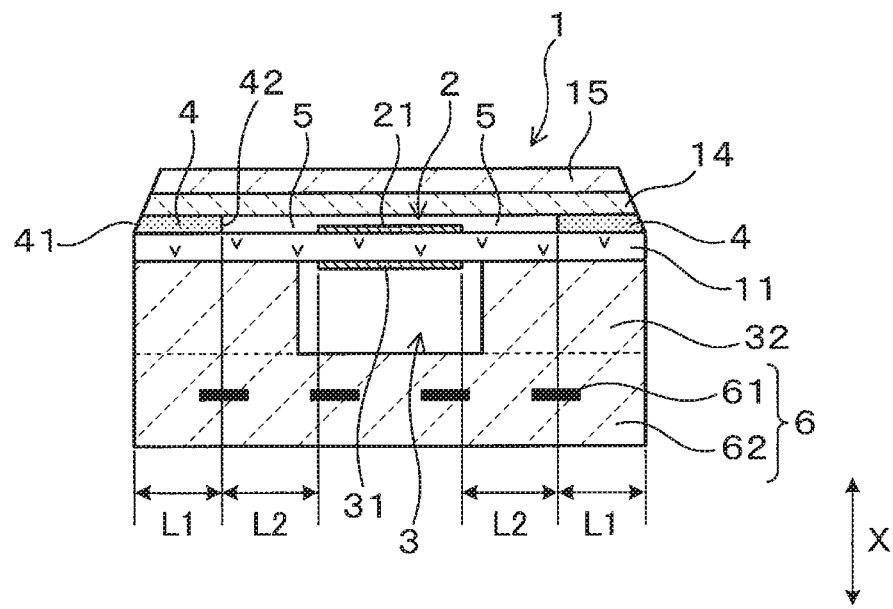
FIG. 1 is a lateral cross-sectional view of a gas sensor element constituting a gas sensor, according to Embodiment 1, and is a cross-sectional view taken along line I-I in FIG. 3.

The inventor of the present disclosure has studied a gas sensor capable of reducing pressure dependence of output of a gas sensor element and achieving both high detection accuracy and stable output.

An exhaust system of an automobile engine is equipped with an exhaust gas purification system including a catalyst for purifying exhaust gas and a gas sensor for detecting oxygen concentration or the like in the exhaust gas. On the basis of a detection result, combustion control is performed and/or a state of the catalyst and the like are monitored. For example, in a stage prior to the catalyst, a gas sensor (i.e., an air-fuel ratio sensor) that outputs an air-fuel ratio signal according to oxygen concentration is arranged to perform feedback control so that a detected air-fuel ratio in the exhaust gas has a target value.

The gas sensor used for such a purpose typically includes a gas sensor element including a solid electrolyte having oxide ionic conductivity. For example, as described in JP 2000-65782 A, the gas sensor element includes a measured gas side electrode that is provided on one surface of the solid electrolyte and is covered by a porous diffusion resistance layer and a reference gas side electrode that is provided on the other surface of the solid electrolyte and faces a reference gas chamber. The porous diffusion resistance layer is formed to cover a surface of the measured gas side electrode and its surroundings. A space portion of limited size is provided between the surface of the measured gas side electrode and the porous diffusion resistance layer. On a side opposite to the space portion, a surface of the porous diffusion resistance layer is covered by a shielding layer to limit an amount of measured gas introduced from an outer peripheral side of the measured gas side electrode into the space portion through the porous diffusion resistance layer.

In recent years, more prompt detection of the air-fuel ratio has been required to improve feedback controllability. Accordingly, for example, the gas sensor element described in JP 2000-65782 A is configured such that in order to improve responsiveness, a volume and height of the space portion are not more than an upper limit value or a porosity of the porous diffusion resistance layer is not less than a lower limit value. Furthermore, the measured gas is mixed in the space portion to minimize variations in sensor characteristics due to an environmental change such as a change in temperature.

Meanwhile, in order to improve responsiveness, consideration has been given to the arrangement of the gas sensor itself at a more upstream position so that the air-fuel ratio is detected at a position closer to the engine. Furthermore, in order to improve combustibility and fuel economy, an engine equipped with a supercharger has drawn attention. In the engine with a supercharger, however, an exhaust gas pressure is high on an upstream side of a turbine, and this leads to a severer pressure environment of the gas sensor element. Thus, depending on a pressure change, output deviation of the gas sensor element is more likely to occur. Furthermore, a problem has been found in which the gas sensor element is easily influenced by pressure fluctuation and the like due to pulsation of the engine, and thus stable output is not obtained.

An object of the present disclosure is to provide a gas sensor capable of reducing pressure dependence of output of a gas sensor element and achieving both high detection accuracy and stable output.

An aspect of the present disclosure is a gas sensor including a gas sensor element for detecting a specific gas concentration in measured gas, wherein: the gas sensor element includes a solid electrolyte having oxide ionic conductivity, a measured gas side electrode that is provided on a measured gas surface of the solid electrolyte and into which measured gas is introduced through a porous diffusion resistance layer, a reference gas side electrode that is provided on a reference gas surface of the solid electrolyte and faces a reference gas chamber, and a diffusion space portion that is provided between the porous diffusion resistance layer and the measured gas side electrode; the porous diffusion resistance layer has a measured gas inlet that is opened to an element outer surface and a measured gas outlet that is opened to the diffusion space portion; and a relationship between a distance L1 between the inlet and the outlet and a distance L2 between the outlet and the measured gas side electrode is expressed by $0<L1/(L1+L2)<0.4$.

Measured gas containing a specific gas passes through a diffusion path constituted by the porous diffusion resistance layer and the diffusion space portion, and reaches the measured gas side electrode. In this case, gas diffusion in the diffusion path involves Knudsen diffusion in which collision of molecules with a wall surface is dominant and molecular diffusion in which collision between molecules is dominant. In general, when the measured gas passes through an inside of the porous diffusion resistance layer composed of a porous material, the Knudsen diffusion and the molecular diffusion both contribute, and in the diffusion space portion, the molecular diffusion contributes more. In a molecular diffusion region, dependence of sensor output on static pressure is smaller than in a Knudsen diffusion region.

Accordingly, by setting a ratio (i.e., L1) of a distance of the porous diffusion resistance layer in a linear distance (i.e., L1+L2) of the diffusion path to be less than 0.4 so that a ratio of the diffusion space portion is relatively large, the molecular diffusion region becomes large, and thus the dependence of sensor output on static pressure can be reduced. Furthermore, by arranging the porous diffusion resistance layer on an inlet side of the diffusion path, a permeation flux is limited, and thus dependence of sensor output on dynamic pressure can be reduced. Therefore, regardless of the pressure environment where the gas sensor is arranged, the pressure dependence can be reduced, and thus stable output can be achieved.

Embodiment 1

An embodiment of a gas sensor will be described below with reference to FIGS. 1 to 10. A gas sensor element 1 shown in FIGS. 1 and 2 constitutes a main portion of a gas sensor S shown in FIG. 3, and detects a specific gas concentration in measured gas. As shown in FIG. 4, for example, in an exhaust gas purification system of an automobile engine which is a vehicle internal combustion engine, the gas sensor S can be used as an oxygen sensor for detecting oxygen concentration which is a specific gas concentration, an air-fuel ratio sensor for detecting an air-fuel ratio (i.e., A/F) on the basis of the oxygen concentration, or the like.

Figure 2:
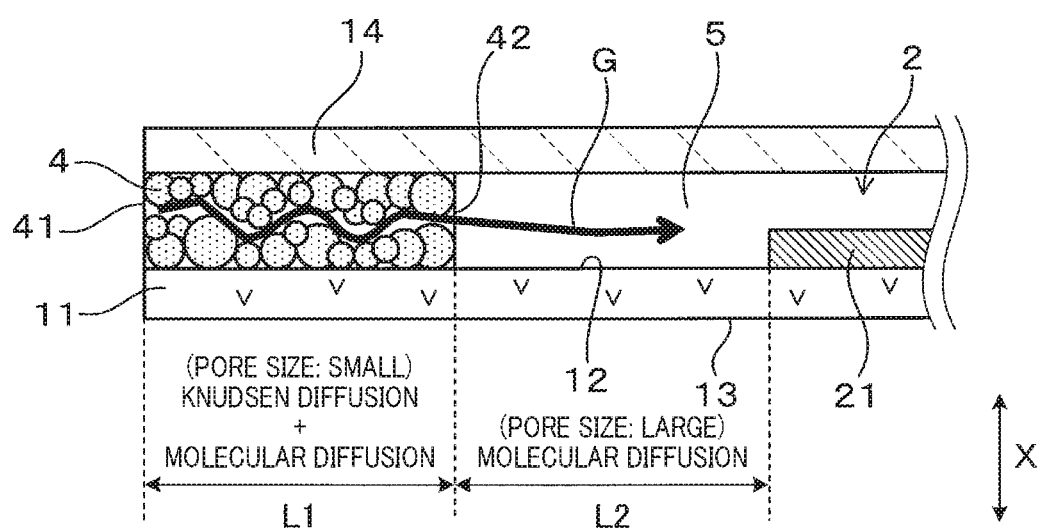
FIG. 2 is a schematic enlarged cross-sectional view showing a main portion of the gas sensor element, according to Embodiment 1.

In FIGS. 1 and 2, the gas sensor element 1 includes a solid electrolyte 11 that has oxide ionic conductivity, a measured gas side electrode 21 that is provided on a measured gas surface 12 of the solid electrolyte 11 and into which measured gas is introduced through a porous diffusion resistance layer 4, a reference gas side electrode 31 that is provided on a reference gas surface 13 of the solid electrolyte 11 and faces a reference gas chamber 3, and a diffusion space portion 5 that is provided between the porous diffusion resistance layer 4 and the measured gas side electrode 21. The gas sensor element 1 is constituted by a laminate laminated in a lamination direction X which is a vertical direction in FIGS. 1 and 2.

The porous diffusion resistance layer 4 has a measured gas inlet 41 that is opened to an element outer surface and a measured gas outlet 42 that is opened to the diffusion space portion 5. In this case, the porous diffusion resistance layer 4 and the diffusion space portion 5 constitute a measured gas diffusion path from the inlet 41 to the measured gas side electrode 21. A relationship between a distance L1 between the inlet 41 and the outlet 42 and a distance L2 between the outlet 42 and the measured gas side electrode 21 is expressed by $0<L1/(L1+L2)<0.4$. By setting a ratio of the porous diffusion resistance layer 4 and the diffusion space portion 5 and appropriately adjusting diffusion path configuration (e.g., pore size distribution, diffusion distance, and the like) of the porous diffusion resistance layer 4 so that the relationship is satisfied, pressure dependence of sensor output can be reduced.

A detailed configuration of the measured gas diffusion path formed in the gas sensor element 1 and its relationship with the pressure dependence will be described later.

Figure 3:
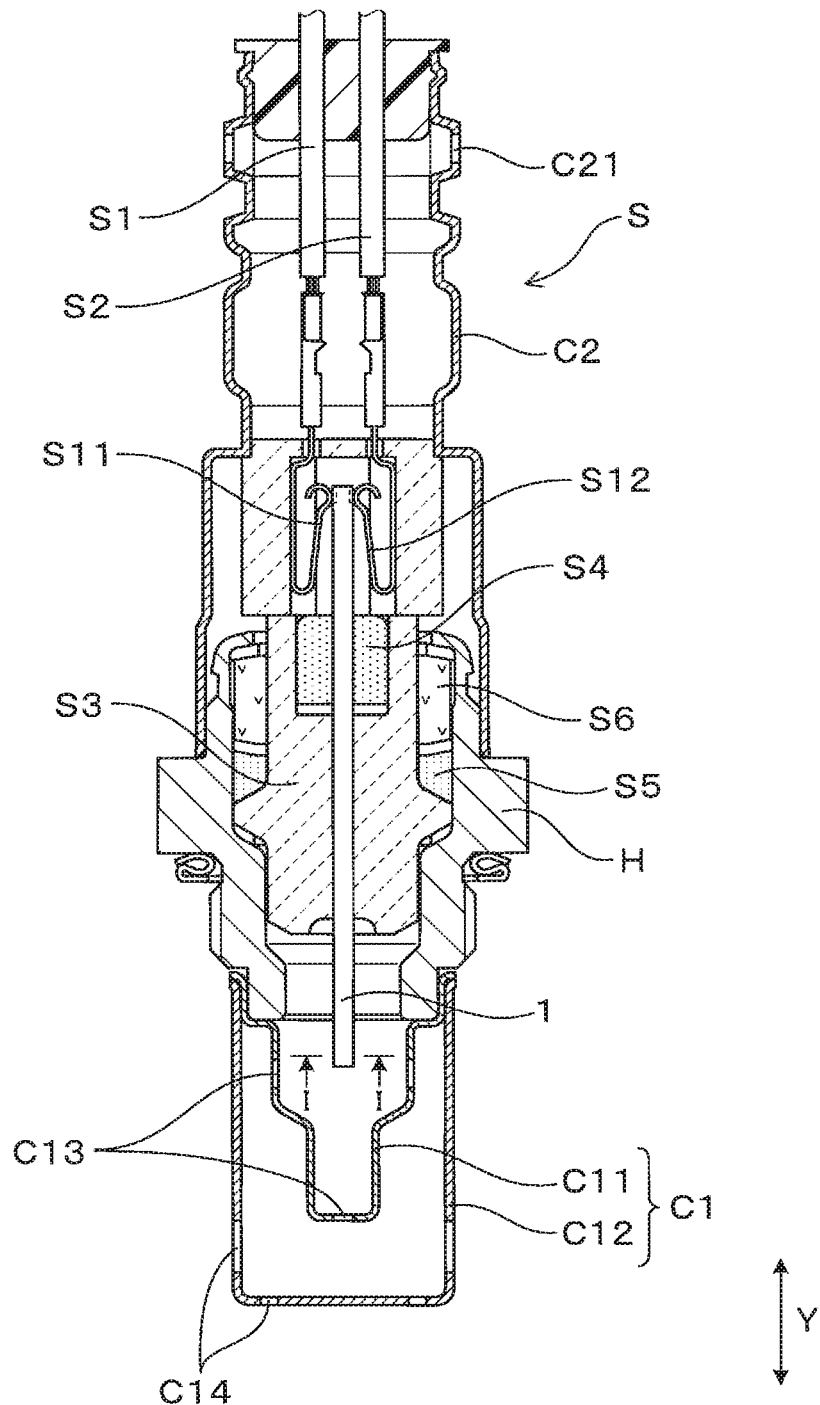
FIG. 3 is a longitudinal cross-sectional view showing an overall structure of the gas sensor, according to Embodiment 1.
Figure 4:
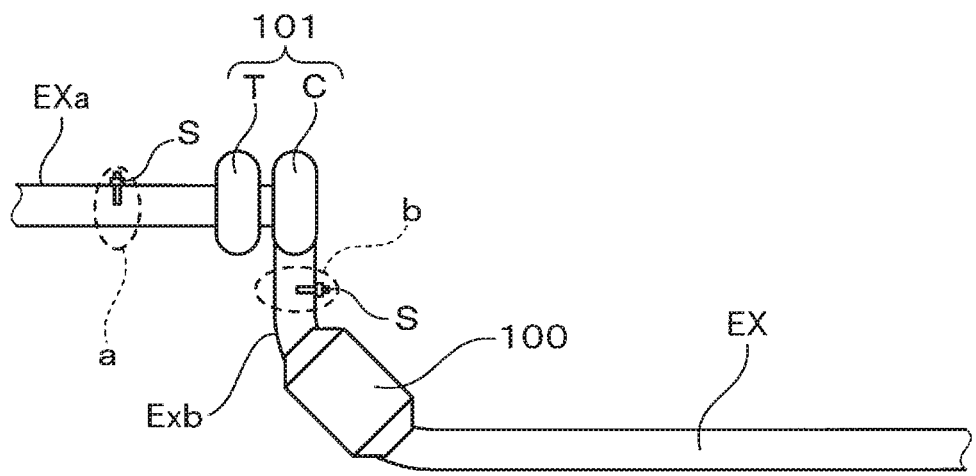
FIG. 4 is a schematic configuration diagram of an exhaust system of an automobile engine showing a configuration of an exhaust gas purification system including the gas sensor, according to Embodiment 1.

In FIG. 3, the gas sensor S includes a tubular housing H that extends in an axial direction Y which is a vertical direction in FIG. 3, the gas sensor element 1 that is inserted and held in the housing H, an element cover C1 that is attached on a tip side of the housing H, and an air side cover C2 that is attached on a base end side of the housing H. A tip portion (i.e., a lower end portion in FIG. 3) of the gas sensor element 1 protrudes from the housing H and is housed inside the element cover C1. The tip portion of the gas sensor element 1 is a detection section including the measured gas side electrode 21 and the reference gas side electrode 31.

The element cover C1 has an inner and outer double structure having a bottomed tubular shape, and is arranged to surround the tip portion of the gas sensor element 1. In the element cover C1, through holes C13 and C14 which are exhaust gas introduction/discharge holes are provided on a side surface or a bottom surface of an inner cover C11 and an outer cover C12. When exhaust gas that has passed through the through holes C13 and C14 reaches a surface of the gas sensor element 1, the exhaust gas is introduced inside the gas sensor element 1 through the porous diffusion resistance layer 4. A base end portion (i.e., an upper end portion in FIG. 3) of the gas sensor element 1 protrudes from the housing H and is housed inside the air side cover C2. The air side cover C2 having a tubular shape has a through hole C21 that is an air hole and is opened to an outer peripheral side surface so that air is introduced inside the air side cover C2.

A plurality of lead wires S1 and S2 connected to an external engine control section (not shown) are insulated and held at a base end opening of the air side cover C2. On a tip side of the lead wires S1 and S2, terminals S11 and S21 are provided and electrically connected to an electrode terminal (not shown) provided at the base end portion of the gas sensor element 1. The electrode terminal of the gas sensor element 1 is connected to the measured gas side electrode 21 and the reference gas side electrode 31 at the tip portion through a lead section. In this case, when a predetermined voltage is applied between the measured gas side electrode 21 and the reference gas side electrode 31, the sensor output exhibits a limiting current characteristic according to oxygen concentration. By using this, an air-fuel ratio signal corresponding to oxygen concentration in the exhaust gas can be obtained.

The gas sensor element 1 is held inside an tubular insulating material S3 housed in the housing H. A sealing glass S4 is filled between a base end side opening of the tubular insulating material S3 and the gas sensor element 1. The tubular insulating material S3 is fixed by supporting an intermediate large-diameter portion of the tubular insulating material S3 on a step portion of the housing H, filling a powder S5 containing talc as a main component between an outer peripheral surface of the tubular insulating material S3 and an inner peripheral surface of the housing H, and crimping a base end thin portion of the housing H through a tubular insulating member S6.

The gas sensor S constitutes a part of the exhaust gas purification system, for example, by being attached to a pipe wall of an exhaust gas pipe EX shown in FIG. 4 with a screw portion provided on an outer periphery of a tip portion of the housing H. The automobile engine is, for example, an engine with a supercharger. In the exhaust gas pipe EX located downstream of a supercharger 101 constituted by a turbine T and a compressor C, a catalyst 100 for exhaust gas purification is arranged. The catalyst 100 is, for example, a publicly known three-way catalyst. The gas sensor S is used as the air-fuel ratio sensor and outputs a detection result to the engine control section (not shown). The engine control section performs combustion control so that an air-fuel ratio in a combustion chamber is a theoretical air-fuel ratio or an air-fuel ratio according to an operating state.

The gas sensor S that detects an air-fuel ratio is typically provided on an upstream side of the catalyst 100. In a conventional engine with a supercharger, the gas sensor S is provided in an exhaust pipe EXb between the supercharger 101 and the catalyst 100. On the other hand, in the present embodiment, in order to improve responsiveness, consideration has been given to the arrangement of the gas sensor S in an exhaust pipe EXa on an upstream side of the turbine T of the supercharger 101 so that exhaust gas is introduced immediately after the exhaust gas is discharged from the engine. In this case, the supercharger 101 is configured to drive the turbine T by an exhaust pressure to rotate the coaxial compressor, and a pressure in the exhaust pipe EXa is higher than in the exhaust pipe EXb. Accordingly, output deviation (i.e., static pressure dependence) due to a pressure change needs to be made small. Furthermore, the gas sensor S is located closer to the engine, and thus a reduction in output fluctuation (i.e., dynamic pressure dependence) due to an increase in pressure pulsation is desired.

In the gas sensor S of the present embodiment, since the gas sensor element 1 has the diffusion path constituted by the porous diffusion resistance layer 4 and the diffusion space portion 5, even in such a pressure environment, output deviation and the like due to the influence of pressure can be reduced. Thus, air-fuel ratio feedback using the gas sensor S can be performed with high controllability.

Next, a detailed configuration of the gas sensor element 1 will be described.

As shown in FIG. 1, the gas sensor element 1 of the present embodiment is configured as a laminated-type element in which a heater section 6 for heating the element is integrally laminated on the detection section including the solid electrolyte 11 having a flat shape. The solid electrolyte 11 is, for example, a flat-shaped zirconia solid electrolyte containing zirconia as a main component. The measured gas side electrode 21 and the reference gas side electrode 31 are formed at positions facing each other on both surfaces of the solid electrolyte 11. Examples of the zirconia solid electrolyte include partially stabilized zirconia obtained by adding a stabilizer such as yttria to zirconia. The measured gas side electrode 21 and the reference gas side electrode 31 are composed of, for example, an electrode material containing noble metal such as platinum.

On a measured gas side of the solid electrolyte 11, a space portion surrounded by the porous diffusion resistance layer 4 and a shielding layer 14 forms a measured gas chamber 2. The shielding layer 14 is constituted by a dense ceramics layer, and prevents exhaust gas from entering the measured gas chamber 2 from a top surface side. A surface of the shielding layer 14 is covered by a protective layer 15 constituted by a ceramics layer. The shielding layer 14 and the protective layer 15 may be composed of, for example, an insulating ceramics material such as alumina.

The porous diffusion resistance layer 4 is laminated on the solid electrolyte 11 and arranged with space outside the measured gas side electrode 21, and constitutes side walls (i.e., left and right side walls in FIG. 1) facing each other of the measured gas chamber 2. The shielding layer 14 is laminated on the porous diffusion resistance layer 4 and faces the measured gas side electrode 21 with space therebetween, and constitutes a top wall of the measured gas chamber 2. A space portion formed on both sides of the measured gas side electrode 21 is the diffusion space portion 5, which constitutes a part of the measured gas chamber 2.

On a reference gas side of the solid electrolyte 11, a ceramic substrate 32 that forms a space portion which is the reference gas chamber 3 is laminated. The reference gas chamber 3 is opened to the base end portion of the gas sensor element 1 and communicates with an internal space of the air side cover C2 shown in FIG. 3. The heater section 6 is constituted by a ceramic substrate 62 and a heater electrode 61 embedded inside the ceramic substrate 62. The ceramics substrates 62 and 32 are composed of, for example, an insulating ceramics material such as alumina. As shown in FIG. 1, the ceramics substrate 62 and the ceramics substrate 32 forming the reference gas chamber 3 may be constituted by an integrated ceramic substrate.

The porous diffusion resistance layer 4 is constituted by a porous ceramics layer, and has predetermined diffusion resistance and allows exhaust gas to pass through. The porous ceramic layer may be composed of, for example, a ceramic material obtained by adding, to aggregate particles constituting a porous skeleton, pore forming particles that are burned away during firing. The aggregate particles are composed of an insulating ceramics material such as alumina, and the pore forming particles are composed of resin or the like. By adjusting a size of the aggregate particles and the pore forming particles and an amount of pore forming particles to be added, a pore size, a porosity, and the like of the porous diffusion resistance layer 4 can be adjusted.

The tip portion of the gas sensor element 1 is arranged inside the element cover C1 shown in FIG. 3, and exhaust gas is present around the gas sensor element 1. In a direction orthogonal to the lamination direction X of the gas sensor element 1, the diffusion path for exhaust gas constituted by the porous diffusion resistance layer 4 and the diffusion space portion 5 is formed on both sides of the measured gas chamber 2. An outer surface of the porous diffusion resistance layer 4 constitutes a side surface of the gas sensor element 1, and serves as the inlet 41 for exhaust gas. An inner surface of the porous diffusion resistance layer 4 serves as the outlet 42 to the diffusion space portion 5. The inlet 41 and the outlet 42 are located on a straight line.

In this case, as shown in an enlarged view of a portion on one side (i.e., a left side in FIG. 2) of the measured gas side electrode 21 in FIG. 2, the exhaust gas passes from the inlet 41 to the outlet 42 through an inside of the porous diffusion resistance layer 4. Furthermore, the exhaust gas passes through the diffusion space portion 5 and reaches the measured gas side electrode 21. As shown in an example of the diffusion path for exhaust gas G indicated by an arrow in FIG. 2, the direction orthogonal to the lamination direction X is a diffusion direction. A distance L1 between the inlet 41 and the outlet 42 of the porous diffusion resistance layer 4 is a length of the porous diffusion resistance layer 4 in the diffusion direction, and a distance L2 between the outlet 42 and the measured gas side electrode 21 is a length of the diffusion space portion 5 in the diffusion direction.

The ratio L1/(L1+L2) is a ratio of the length of the porous diffusion resistance layer 4 to a length of the diffusion path in the diffusion direction (i.e., the length of the porous diffusion resistance layer 4+the length of the diffusion space portion 5). Gas diffusion in the diffusion path typically involves Knudsen diffusion and molecular diffusion. When a representative length (e.g., corresponding to a pore size) of the diffusion path is sufficiently smaller than a mean free path on which molecules collide with each other, the gas diffusion in the diffusion path is Knudsen diffusion in which collision of molecules with a wall surface is dominant. When the representative length of the diffusion path is sufficiently larger than the mean free path, gas diffusion in the diffusion path is molecular diffusion in which collision between molecules is dominant. In the porous diffusion resistance layer 4 in which a porous material forms the diffusion path, Knudsen diffusion and molecular diffusion both presumably contribute, and as the pore size becomes smaller, the rate of collision between molecules and the wall surface is increased, and as the pore size becomes larger, the rate of collision between molecules is increased. On the other hand, in the diffusion space portion 5, the pore size is presumably sufficiently large, and thus the molecular diffusion is dominant.

Figure 5:
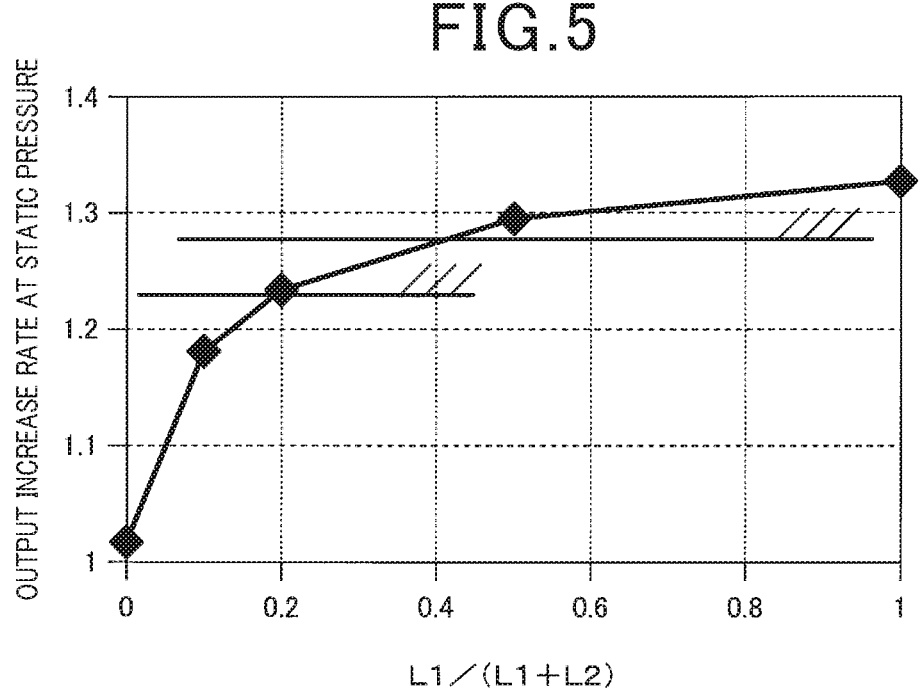
FIG. 5 shows a relationship between a ratio of a porous diffusion resistance layer constituting a diffusion path of the gas sensor element and an output increase rate at static pressure, according to Embodiment 1.

Thus, a smaller ratio L1/(L1+L2) leads to a larger ratio of the diffusion space portion 5 and a larger region in which the molecular diffusion is dominant. As shown in FIG. 5, as a result of evaluation of a change in output increase rate at static pressure when the ratio L1/(L1+L2) is varied in the range of 0 to 1, it has been found that a smaller ratio L1/(L1+L2) leads to a greater reduction in the output increase rate at static pressure. The output increase rate at static pressure is expressed by the following Equation 1.

Equation 1: Output increase rate at static pressure=IL at pressure during evaluation/IL at atmospheric pressure In Equation 1, IL represents a theoretical formula (i.e., concentration diffusion amount) for the sensor output at static pressure, and is expressed by the following Equation 2. The pressure during evaluation is a pressure higher than atmospheric pressure, and corresponds to, for example, a pressure in the exhaust pipe EXa on the upstream side of the supercharger 101 in FIG. 4.

$$IL = -(4FP/RT) \cdot D \cdot (S/L) \cdot \ln[1-(P_{O2}/P)] \quad \text{Equation 2}$$

In Equation 2,
IL: Sensor current value [A],
F: Faraday constant [C/mol],
P: Pressure [Pa (abs)],
R: Gas constant [J/(mol·K)],
T: Temperature [K],
S: Cross-sectional area [m$^2$] of diffusion layer,
L: Diffusion distance [m],
$P_{O2}$: Oxygen partial pressure [Pa].

In Equation 2, D represents a diffusion coefficient, and is expressed by the following Equation 3 using a Knudsen diffusion coefficient Dk and a molecular diffusion coefficient Dm.

$$D = (\varepsilon/\tau) \cdot [1/(1/Dk + 1/Dm)] \quad \text{Equation 3}$$

In Equation 3,
ε: Porosity,
τ: Tortuosity factor.

Among these, the Knudsen diffusion coefficient Dk is expressed by the following Equation 4, and the molecular diffusion coefficient Dm is expressed by the following Equation 5.

$$Dk = (4/3) \cdot r \cdot \sqrt{(2RT/nM_1)} \quad \text{Equation 4}$$

$$Dm = \{0.00067 T^{1.83}/P[(T_{C1}/P_{C1})^{(1/3)} + (T_{C2}/P_{C2})^{(1/3)}]^3\} \cdot \sqrt{(1/M_1) + (1/M_2)} \quad \text{Equation 5}$$

In Equations 4 and 5,
$P_{C1}$: O$_2$ critical pressure [atm],
$T_{C1}$: O$_2$ critical temperature [K],
$P_{C2}$: N$_2$ critical pressure [atm],
$T_{C2}$: N$_2$ critical temperature [K],
$M_1$: O$_2$ molecular weight [g/mol],
$M_2$: N$_2$ molecular weight [g/mol].

As clear from Equation 2, the sensor output IL at static pressure is proportional to the diffusion coefficient D and the pressure P. As shown in Equation 3, the diffusion coefficient D is determined according to the degree of contribution of the Knudsen diffusion and the molecular diffusion. Among these, the Knudsen diffusion coefficient Dk is proportional to the average pore size r of the porous diffusion resistance layer 4, and the molecular diffusion coefficient Dm is inversely proportional to the pressure P. Thus, a higher degree of contribution of the molecular diffusion in the diffusion path can achieve smaller pressure dependence of sensor output based on Equation 2. For that purpose, in addition to the degree of contribution of the molecular diffusion in the porous diffusion resistance layer 4, the ratio of the diffusion space portion 5 in which the molecular diffusion is dominant is preferably high.

Thus, a smaller ratio L1/(L1+L2) in FIG. 5, i.e., a larger ratio of the diffusion space portion 5 achieves a larger molecular diffusion region and a smaller output increase rate at static pressure. Specifically, as shown in the results in FIG. 5, in the range in which the ratio L1/(L1+L2) is less than 0.4, the output increase rate at static pressure is sufficiently smaller than 1.3 and satisfies a characteristic required in the exhaust gas purification system. The ratio L1/(L1+L2) is preferably in the range of 0.2 or less, and in that case, the output increase rate at static pressure is greatly reduced to approximately 1.2 or less.

Thus, by appropriately setting the ratio L1/(L1+L2), the output deviation dependent on the static pressure is reduced, and thus detection accuracy at static pressure can be improved. On the other hand, also with regard to dynamic pressure such as pulsation occurring in the exhaust pipe EX, by appropriately setting the ratio and configuration of the porous diffusion resistance layer 4, the influence of pressure fluctuation can be made small.

The following Equation 6 is a theoretical formula for the sensor output during pressure fluctuation. In Equation 6, Q represents a theoretical formula for the permeation flux, and is expressed by the following Equation 7

$$IL=4QSCF \qquad \text{Equation 6}$$

$$Q=\varepsilon \cdot (r_p^2/8\eta) \cdot [(P_1-P_2)/RTL] \cdot [(P_1+P_2)/2] \qquad \text{Equation 7}$$

In Equations 6 and 7,
IL: Sensor current value [A],
Q: Permeation flux [mol/(m²·s)],
S: Cross-sectional area [m²] of diffusion layer,
C: Oxygen concentration [−],
F: Faraday constant [C/mol],
ε: Porosity [−],
$r_p$: Pore radius [m],
η: Gas viscosity [Pa·s],
P: Pressure [Pa (abs)]
R: Gas constant [J/(mol·K)],
IL: Sensor current value [A],
T: Temperature [K],
L: Diffusion distance [m].

According to Equation 6, in order to reduce the dynamic pressure dependence, it is effective to reduce the permeation flux Q during pressure fluctuation expressed by Equation 7. According to Equation 7, since the permeation flux Q is proportional to the pore radius $r_p^2$, a smaller pore serving as the diffusion path in the porous diffusion resistance layer 4 can achieve a smaller permeation flux Q and a smaller pressure dependence during pressure fluctuation. In this case, a smaller average pore size and a smaller maximum pore size are preferable. For example, a pore size D90 at a cumulative rate of 90% in the pore size distribution can be regarded as an almost maximum pore size. For convenience, the pore size D90 is hereinafter referred to as maximum pore size D90.

Figure 6:
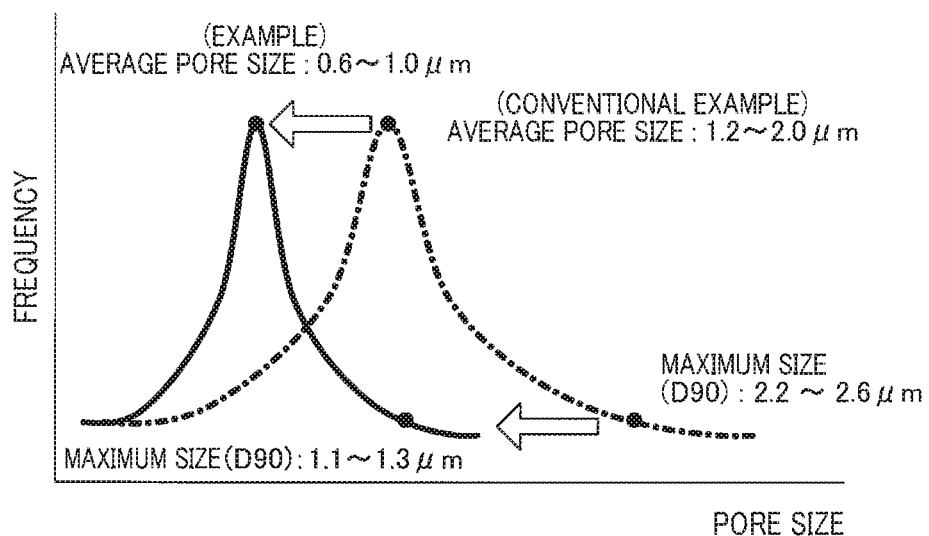
FIG. 6 shows an example of an average pore size distribution of the porous diffusion resistance layer constituting the diffusion path of the gas sensor element according to Embodiment 1, in comparison with an example of that of a conventional gas sensor element configuration.
Figure 7:
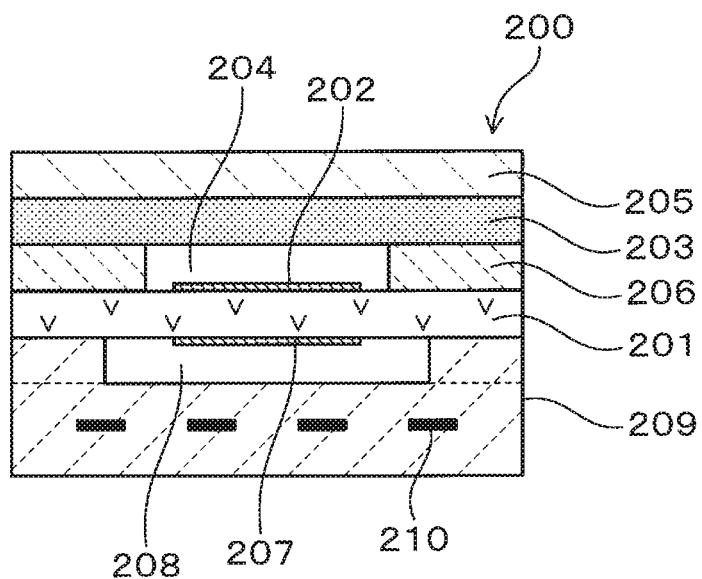
FIG. 7 is a lateral cross-sectional view showing an example of the conventional gas sensor element configuration.

As shown in FIG. 6, the average pore size and the maximum pore size D90 in the pore size distribution of the porous diffusion resistance layer 4 are preferably smaller than an average pore size (e.g., 1.2 μm to 2.0 μm) and a maximum pore size D90 (e.g., 2.2 μm to 2.6 μm) in a pore size distribution of a porous diffusion resistance layer in a sensor element configuration shown as a conventional example in FIG. 6. For example, as shown in FIG. 7, in a conventional sensor element 200, a porous diffusion resistance layer 203 constitutes a top surface of a measured gas chamber 204 in which a measured gas side electrode 202 is arranged. A surface of the porous diffusion resistance layer 203 is covered by a shielding layer 205, and the porous diffusion resistance layer 203 is opened to an element side surface.

In FIG. 7, the measured gas side electrode 202 is arranged close to an inner side of a ceramics layer 206 having a vent hole that forms the measured gas chamber 204, and exhaust gas that has passed from the element side surface through the porous diffusion resistance layer 203 is introduced from the top surface side of the measured gas chamber 204 into the measured gas chamber 204. According to this configuration, a long diffusion path is formed in the porous diffusion resistance layer 203. Thus, for example, when attempting to ensure responsiveness, it is difficult to make the average pore size and the maximum pore size D90 sufficiently small. On the other hand, in the sensor element 1 of the present embodiment, the diffusion path constituted by the porous diffusion resistance layer 4 and the diffusion space portion 5 is provided on a lateral side of the measured gas side electrode 21, and the ratio of the diffusion space portion 5 is large. Accordingly, even when the porous diffusion resistance layer 4 has a small pore size, high responsiveness is achieved.

The configuration of the conventional sensor element 200 is similar to that of the sensor element 1 of the present embodiment in that the measured gas side electrode 202 and a reference gas side electrode 207 are provided at positions facing each other on both surfaces of a solid electrolyte 201, the reference gas side electrode 207 is arranged in a reference gas chamber 208 provided in a ceramics substrate 209, and a heater electrode 210 is embedded in the ceramics substrate 209.

As shown in the pore size distribution in FIG. 6 as Example, the average pore size of the porous diffusion resistance layer 4 is more preferably in the range of 0.6 μm to 1.0 μm. Furthermore, the maximum pore size D90 is preferably in the range of 1.1 μm to 1.3 μm. When the average pore size and the maximum pore size D90 are in the above ranges which are sufficiently smaller than the conventional average pore size and maximum pore size D90, the effect of reducing the dynamic pressure dependence can be improved.

Figure 8:
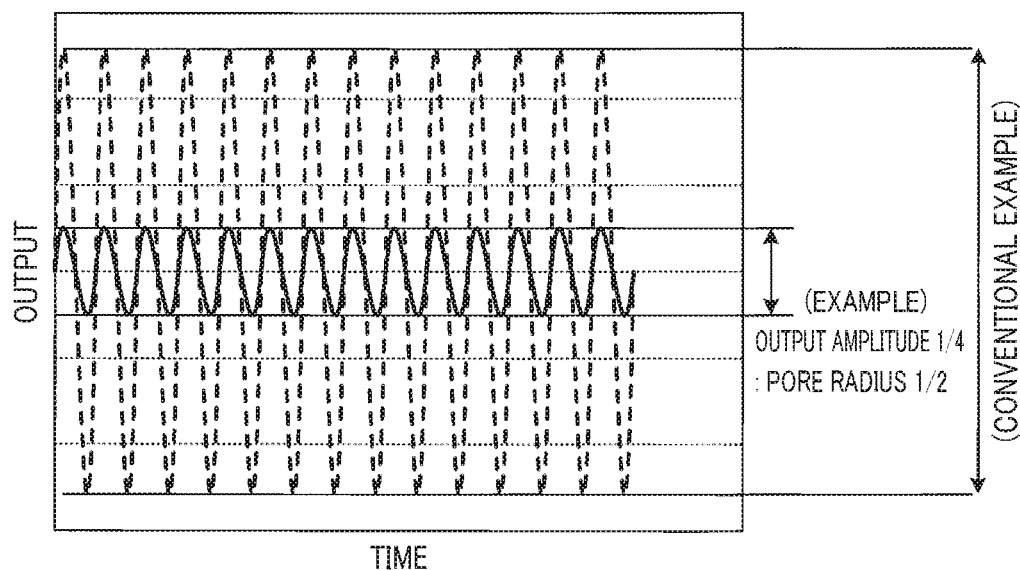
FIG. 8 shows a relationship between an output amplitude during pressure fluctuation of the gas sensor element and an average pore size distribution, according to Embodiment 1.

Thus, as shown in FIG. 8, sensor output fluctuation can be sufficiently reduced. Specifically, for example, by reducing the pore radius by half, the permeation flux is reduced, and thus an output amplitude during pressure fluctuation based on Equations 6 and 7 can be reduced to a quarter. This leads to further improvement of the detection accuracy.

Figure 9:
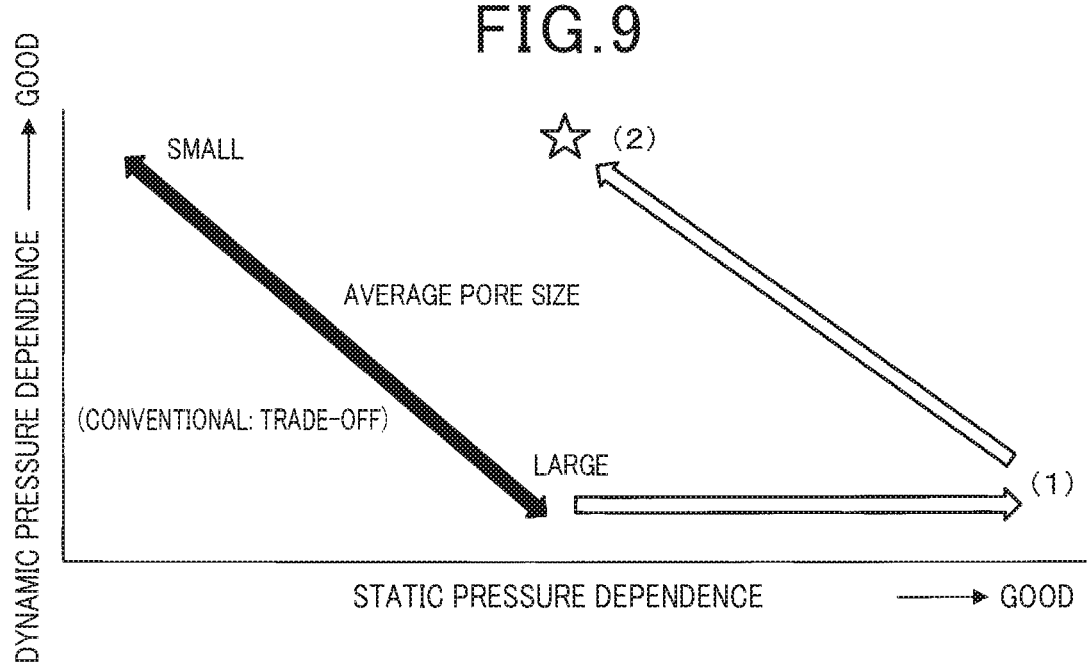
FIG. 9 shows an effect on static pressure dependence and dynamic pressure dependence, according to Embodiment 1.

As a result, as shown in FIG. 9, both the static pressure dependence and the dynamic pressure dependence of the sensor element 1 can be reduced. As described above, in order to reduce the dynamic pressure dependence (i.e., output increase rate at dynamic pressure), the average pore size is preferably smaller so that the permeation flux is reduced, while in order to reduce the static pressure dependence (i.e., output increase rate at static pressure), the average pore size is preferably larger so that the contribution of the molecular diffusion is greater than that of the Knudsen diffusion. According to the configuration of the conventional sensor element 200, the diffusion path is mainly constituted by the porous diffusion resistance layer 203, and as shown in a left half in FIG. 9, when the average pore size is increased, the static pressure dependence is improved but the dynamic pressure dependence is deteriorated. Accordingly, the static pressure dependence and the dynamic pressure dependence are in a trade-off relationship, and the reduction in the pressure dependence has been limited.

On the other hand, in the gas sensor element 1 of the present embodiment, the diffusion space portion 5 sufficiently larger than the porous diffusion resistance layer 4 is provided between the diffusion resistance layer 4 and the measured gas side electrode 21, and thus (1) the contribution of the molecular diffusion can be further increased, so that the static pressure dependence can be reduced. Accordingly, even when the pore size of the porous diffusion resistance layer 4 becomes smaller, the static pressure dependence is not greatly deteriorated, and thus (2) for example, by defining the average pore size and the maximum pore size D90, the permeation flux during pressure fluctuation is reduced, so that the dynamic pressure dependence can be reduced.

Figure 10:
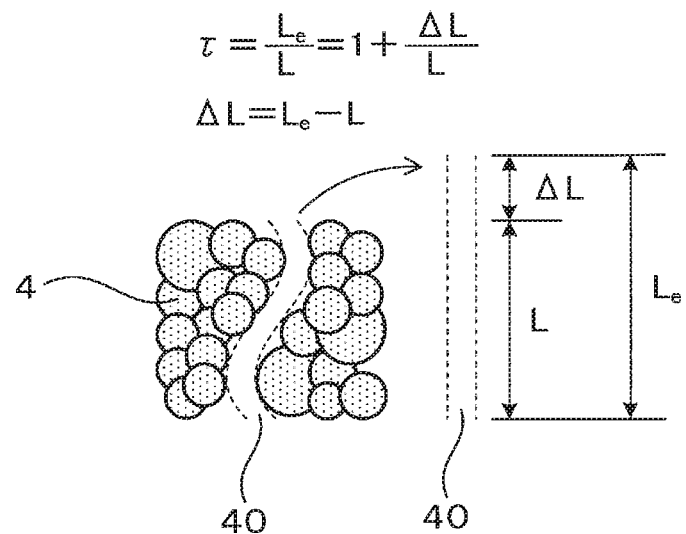
FIG. 10 shows a relationship between a tortuosity factor and an actual diffusion distance, according to Embodiment 1.

Preferably, by further reducing an actual diffusion distance of the diffusion path, the responsiveness can be improved. As shown in FIG. 10, a diffusion path 40 formed in the porous diffusion resistance layer 4 is composed of a pore made of a void between particles, and thus has a bent shape along a particle surface. A length (i.e., an actual diffusion distance Le of the porous diffusion resistance layer 4) of the linearly extended diffusion path 40 is longer than a length (i.e., an apparent diffusion distance L) of the porous diffusion resistance layer 4, and a relationship between a difference ΔL in length between the linearly extended diffusion path 40 and the porous diffusion resistance layer 4 is expressed by ΔL=Le−L.

In this case, a tortuosity factor τ is expressed by the following Equation 8, and can be calculated by a known tortuosity factor measurement method using the following Equation 9.

$$\tau = Le/L = 1 + \Delta L/L \qquad \text{Equation 8}$$

$$Le/L = \sqrt{(\varepsilon/2k) \cdot (Vp/SBET)} \qquad \text{Equation 9}$$

In Equation 9,
ε: Porosity,
k: Permeability coefficient,
Vp: Pore specific volume,
SBET: Specific surface area.

For example, the porosity ε and the pore specific volume Vp can be calculated by pore size distribution measurement using a mercury penetration method, the BET method specific surface area SBET can be calculated by nitrogen gas/krypton gas adsorption measurement, and the Darcy permeability coefficient k can be calculated by air permeability measurement by permporometry.

Thus, the actual diffusion distance of the diffusion path constituted by the porous diffusion resistance layer 4 and the diffusion space portion 5 is expressed by the following Equation 10.

$$\text{Actual diffusion distance of diffusion path} = \tau 1 \times L1 + \tau 2 \times L2 \qquad \text{Equation 10}$$

In Equation 10,
τ1: Tortuosity factor of porous diffusion resistance layer 4,
τ2: Tortuosity factor of diffusion space portion 5.

The tortuosity factor of the diffusion space portion 5 is τ2~1.

The actual diffusion distance Le of the porous diffusion resistance layer 4 is preferably less than 2.0 mm. As described above, a smaller pore size of the porous diffusion resistance layer 4 leads to a greater reduction in the dynamic pressure dependence. However, a long diffusion path inside the porous diffusion resistance layer 4 influences the responsiveness. Also in this case, by adjusting the pore size or the like of the porous diffusion resistance layer 4 so that the actual diffusion distance Le is less than 2.0 mm, the responsiveness can be ensured.

Embodiment 2

In Embodiment 1, the porous diffusion resistance layer 4 is arranged on the both sides of the measured gas side electrode 21 to form the side walls facing each other of the measured gas chamber 2. However, the porous diffusion resistance layer 4 may be arranged to face the measured gas side electrode 21. The case where the porous diffusion resistance layer 4 is arranged in this manner will be described as Embodiment 2 focusing on differences from Embodiment 1.

Among reference signs used in Embodiment 2 and subsequent embodiments, the same reference signs as those used in the embodiments previously described indicate the same components or the like as those in the embodiments previously described, unless particularly stated.

Figure 11:
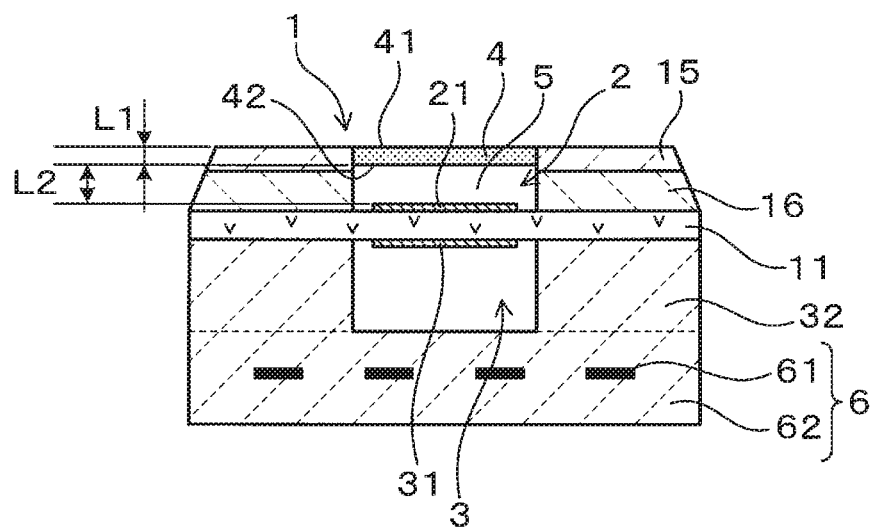
FIG. 11 is a lateral cross-sectional view of a gas sensor element constituting a gas sensor, according to Embodiment 2.

As shown in FIG. 11, the gas sensor element 1 of the present embodiment includes the measured gas side electrode 21 and the reference gas side electrode 31 that are located at positions facing each other on both surfaces of the solid electrolyte 11 having a flat shape. The measured gas chamber 2 in which the measured gas side electrode 21 is arranged is formed in a vent hole on a ceramics layer 16. A surface of the ceramics layer 16 is covered by the protective layer 15. In the vent hole of the ceramics layer 16, the porous diffusion resistance layer 4 is arranged, and constitutes the top wall of the measured gas chamber 2. A portion around the porous diffusion resistance layer 4 is shielded by the protective layer 15. The porous diffusion resistance layer 4 has the inlet 41 for exhaust gas on an upper surface side in FIG. 11 and the outlet 42 to the diffusion space portion 5 on a lower surface side in FIG. 11. The diffusion space portion 5 is a space between the measured gas side electrode 21 and the outlet 42, and constitutes a part of the measured gas chamber 2. The inlet 41 and the outlet 42 are located on a straight line.

Also in the present embodiment, the gas sensor element 1 is configured such that a relationship between the distance L1 between the inlet 41 and the outlet 42 of the porous diffusion resistance layer 4 and the distance L2 between the outlet 42 and the measured gas side electrode 21 is expressed by 0<L1/(L1+L2)<0.4. Furthermore, the pore size and the maximum pore size D90 of the porous diffusion resistance layer 4 and the actual diffusion distance of the porous diffusion resistance layer 4 are defined in a similar manner to Embodiment 1. This configuration achieves a similar effect of reducing the static pressure dependence and the dynamic pressure dependence and improving the responsiveness.

Embodiment 3

In Embodiments 1 and 2, the porous diffusion resistance layer 4 is configured to open to the side surface of the tip portion of the gas sensor element 1. However, the porous diffusion resistance layer 4 may be configured to open to a tip end surface of the gas sensor element 1. In this case, in the gas sensor element 1 shown in FIG. 3, the porous diffusion resistance layer 4 is configured such that the inlet of the porous diffusion resistance layer 4 is opened to the tip end surface (i.e., lower end surface in FIG. 3) of the gas sensor element 1. For example, in the enlarged cross-section of the gas sensor element 1 shown in FIG. 2, the porous diffusion resistance layer 4 and the diffusion space portion 5 only need to be arranged so that the diffusion direction of the exhaust gas G is the axial direction Y in FIG. 3.

According to the configuration of the present embodiment, the diffusion path constituted by the porous diffusion resistance layer 4 and the diffusion space portion 5 extends in the axial direction Y. Thus, as compared with when the diffusion space portion 5 is arranged on the side surface of the gas sensor element 1, the gas sensor element 1 can be miniaturized in a width direction, and this allows, for example, early activation by concentrated heating using the heater section 6. Furthermore, by increasing a length in the axial direction of the gas sensor element 1, the diffusion space portion 5 can be increased. Accordingly, the adjustment of the ratio L1/(L1+L2) for the diffusion path is relatively easy, and an increase in size of the gas sensor S in a radial direction can be prevented. Thus, the gas sensor S that is small and has high responsiveness and high accuracy is obtained.

The present disclosure is not limited to the above embodiments, and can be applied to various embodiments without departing from the scope of the present disclosure.

For example, in the above embodiments, the gas sensor S includes the laminated-type gas sensor element 1, but the gas sensor element 1 may be a cup-shaped element including a bottomed cylindrical solid electrolyte. In this case, a diffusion path to a measured gas side electrode is constituted by a porous diffusion resistance layer and a diffusion space portion by arranging a reference gas side electrode in a reference gas chamber inside the solid electrolyte and arranging a measured gas side electrode outside the solid electrolyte so that the measured gas side electrode faces the reference gas side electrode. Furthermore, in the case where the laminated-type gas sensor element 1 is used, the gas sensor element 1 may be a gas sensor element that includes two solid electrolytes and in which an auxiliary oxygen pump cell for pumping oxygen is laminated on a measurement oxygen concentration cell facing a measured gas chamber.

Furthermore, in the examples in the above embodiments, the gas sensor S is applied to the exhaust gas purification system of the automobile engine with a supercharger, but the present disclosure is not limited to the engine with a supercharger. For example, the gas sensor S may be attached to a position, such as a position on an upstream side of a gasoline particulate filter, at which an exhaust pressure is higher than other portions, and also in that case, a similar effect is achieved. Furthermore, the configuration of the gas sensor S is not limited to those described in the above embodiments, and the configuration of the element cover and other components can be modified as appropriate. Furthermore, the gas sensor S is also applicable to an internal combustion engine other than the automobile internal combustion engine.

What is claimed is:

1. A gas sensor comprising a gas sensor element for detecting a specific gas concentration in measured gas, wherein:
   the gas sensor element includes
      a solid electrolyte having oxide ionic conductivity,
      a measured gas side electrode that is provided on a measured gas surface of the solid electrolyte and into which measured gas containing oxygen as the specific gas is introduced through a porous diffusion resistance layer,
      a reference gas side electrode that is provided on a reference gas surface of the solid electrolyte and faces a reference gas chamber, and
      a diffusion space portion that is provided between the porous diffusion resistance layer and the measured gas side electrode and that constitutes a part of a measured gas chamber;
   the porous diffusion resistance layer is located at a tip portion of the gas sensor element, the porous diffusion resistance layer has a measured gas inlet that is opened to an element outer surface and a measured gas outlet that is opened to the diffusion space portion, the inlet and the outlet of the porous diffusion resistance layer being located on a straight line;
   a relationship between a distance L1 between the inlet and the outlet and a distance L2 between the outlet and the measured gas side electrode is expressed by $0 < L1/(L1+L2) < 0.4$;
   the porous diffusion resistance layer has an average pore size in the range of 0.6 μm to 1.0 μm;
   the porous diffusion resistance layer has a pore size D90 in the range of 1.1 μm to 1.3 μm, the pore size D90 being a pore size at a cumulative rate of 90% in a pore size distribution; and
   in the porous diffusion resistance layer, an actual diffusion distance of a measured gas diffusion path from the inlet to the outlet is 2.0 mm or less, the actual diffusion distance of the measured gas diffusion path being a length of the measured gas diffusion path when the measured gas diffusion path is linearly extended.

2. The gas sensor according to claim 1, wherein:
   the porous diffusion resistance layer is provided outside the measured gas side electrode on the measured gas surface of the solid electrolyte; and
   a shielding layer is provided on a surface of the porous diffusion resistance layer except the inlet.

3. The gas sensor according to claim 1, wherein the inlet of the porous diffusion resistance layer is opened to a tip end surface or a side surface of the gas sensor element.

* * * * *